T. N. FOSTER.
Harvester.
No. 30,215.  Patented Oct. 2, 1860.
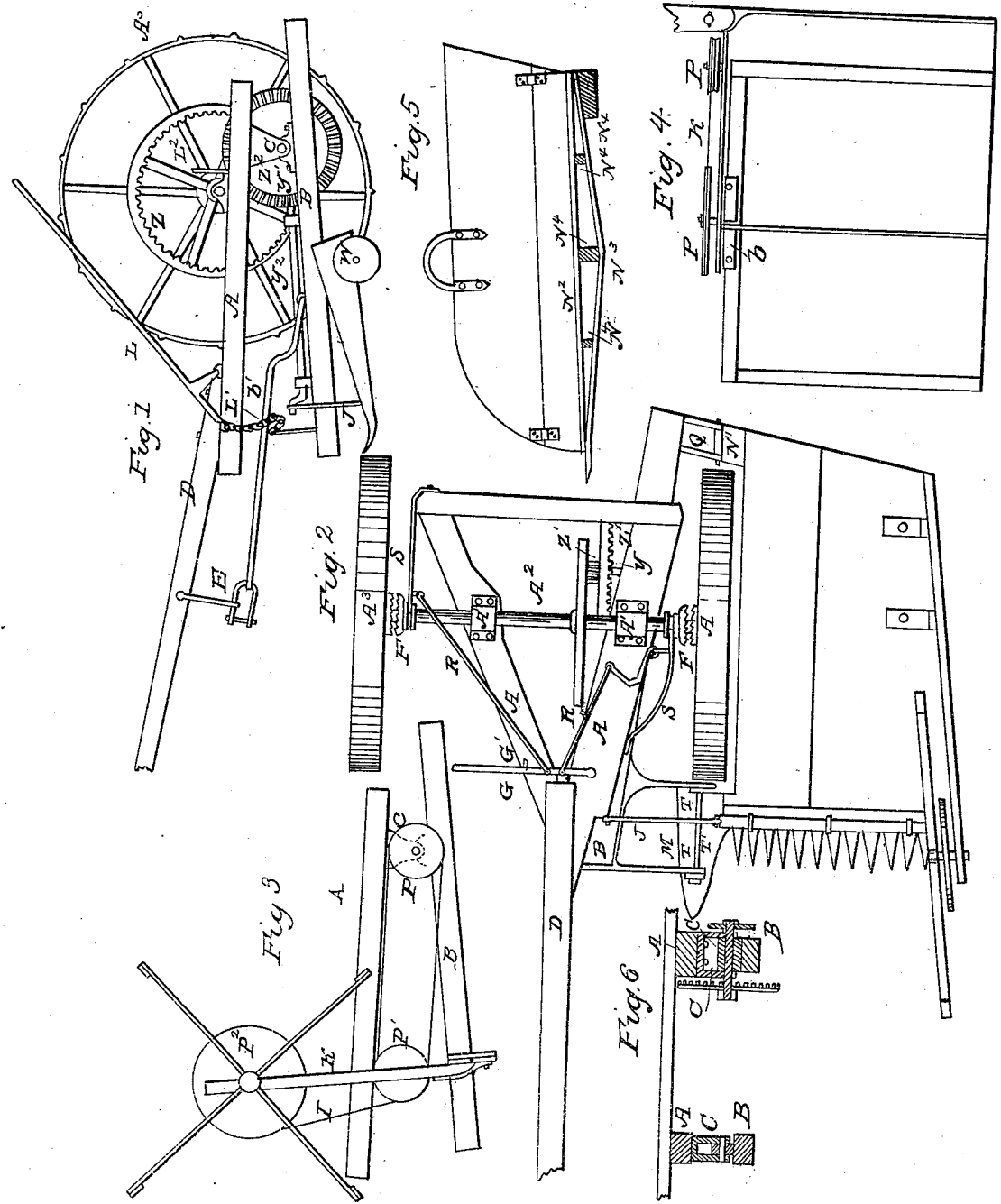
INVENTOR
T N Foster

UNITED STATES PATENT OFFICE.

THOMAS N. FOSTER, OF WATERTOWN, NEW YORK.

IMPROVEMENT IN HARVESTERS.

Specification forming part of Letters Patent No. 30,215, dated October 2, 1860.

*To all whom it may concern:*

Be it known that I, T. N. FOSTER, of Watertown, in the county of Jefferson and State of New York, have invented certain new and useful Improvements in Harvesters for Grain, Grass, &c.; and I do hereby declare that the same is described and represented in the following specification and drawings.

To enable others skilled in the art to make and use my improvements, I will proceed to describe their construction and operation, referring to the drawings, in which the same letters indicate like parts in each of the figures.

Figure 1 is an elevation of one side of my machine. Fig. 2 is a plan or top view. Fig. 3 is an elevation of the pulleys for the reel. Fig. 4 is a side elevation of the reel. Fig. 5 is a cross-section of the platform. Fig. 6 is a cross-section showing the connection of the frames A and B.

The nature of my invention and improvement in harvesters consists in the arrangement of a frame mounted on wheels and carrying a lower frame, which is hinged to it behind the carrying-axle, so as to vibrate and carry the finger-bar and cutters before the axle, applying a tongue or pole to the upper frame and the draft-rod to the lower frame, so as to allow both frames to vibrate freely, and hanging or hinging the cutter-bar and platform to the lower frame, all as hereinafter described.

In the accompanying drawings, A A is a triangular frame, to which the boxes A' A' are fastened for the axle $A^2$ to turn in, as shown in Fig. 1. The carrying and driving wheels $A^3$ are fitted to turn freely on the ends of the axle $A^2$, and both of them are provided with clutches to correspond with the clutches F F, which slide on the axle over a feather, so arranged as to lock the wheels to the axle and turn it to drive the cutting apparatus, as will be hereinafter described. The springs S S, fastened to the frame A, are fitted to grooves in the clutches F F, so as to press them out and lock the wheels to the shaft or axle. The links R R are connected to the springs S S and to the lever G, so that when the lever is pulled and placed before the stud G' the clutches are drawn from the wheels, so that they turn freely on the axle, while the axle ceases to turn until the lever G is raised, so as to allow the springs to throw the clutches against the wheels and lock them to the axle again.

D is a tongue or pole by which the horses guide the machine.

B is a triangular frame similar in form to the frame A, and is placed right below it, and the two frames are connected by hinges C C, Figs. 1 and 6, so that the lower frame, B, which carries the cutting apparatus, can vibrate and allow the cutting apparatus to follow the undulations of the ground, so as to cut the stubble short and save the crop on uneven ground. The lever L is hinged on the top of the frame A, and is connected by the chain L' to the fore end of the frame B, so as to raise it and hold it up by depressing the lever L and placing it under the hook $L^2$ in the frame A.

D' is a draft-link fastened to the frame B, and connected to the pole D by the link E, just behind where the single-tree is hung to the draft-link, so as to draw the machine by the lower frame, B, and guide it by the frame A.

N is the finger-bar, and N' the rear bar, of the platform $N^2$, upon which the grain falls as it is cut. The finger-bar N is fastened to the shoe M, which has two lugs on it, through which the bolt T' passes, which connects the shoe M to the arms T T, fastened to the fore end of the frame B, as shown in Fig. 2, so as to allow the shoe M and finger-bar N to vibrate and follow the undulations of the ground that it is drawn over when the machine is worked, the rear bar, N', of the platform being hinged to the rear of the frame B, as shown at Q, Fig. 2, so that one of the wheels $A^3$ runs between the frame B and the platform $N^2$. The outer edge of the platform is supported by the axle of the wheel W.

To operate the cutter-bar and cutters, the annular gear Z is fastened to the axle $A^2$ and turns the pinion Z' and gear $Z^2$ on the shaft Y, which shaft turns in the hinge C, as shown in Figs. 1 and 6. The gear $Z^2$ turns the pinion Y' and crank-shaft $Y^2$, which turns in boxes fastened to the frame B, and the crank is connected to the cutter-bar by the link J, so as to traverse it and the cutters when the axle $A^2$ is turned by the wheels $A^3$; and the clutches F F are so constructed that if the machine is run back, or one wheel turns faster than the other, the clutch slips, so that the axle is never turned backward. The reel-bearer K is fastened to the lug of the shoe M, and the beam K′ to the side of the platform some distance behind the cutter-bar, and the reel is made of two frames provided with journals upon which the reel turns. The ends of the arms are connected by bars, as shown in Fig. 4, so as to form a reel without a shaft, which will be far less likely to be become obstructed by grain or weeds than if it had a shaft extending through the center. To turn this reel, a pulley, P, is fastened to the shaft Y, with a score in it for the band I, which passes around one of the pulleys P′, and up over the pulley P² on the journal of the reel, then down around the pulley P³ to the pulley P again. The pulleys P′ and P³ turn on a stud fastened to the frame B. The platform N² is stiffened and supported between the finger and back bars by the curved or angular boarding N³ and cross-pieces N⁴, as shown in Fig. 5 of the drawings.

With my improvements the driver has control of the finger-bar and cutters, and can raise and lower them at will, so as to cut the stubble long or short, as may be desirable, or elevate the finger-bar to pass stones, stumps, or other obstructions.

I believe I have described and represented my improvements in harvesters so as to enable any person skilled in the art to make and use them. I will now state what I desire to secure by Letters Patent.

What I claim is—

The arrangement of the three hinged frames N N′, A, and B with their hinges in relation to each other, the axle A², and inner driving-wheel, A³, in combination with the rigid and flexible draft-connection D D′, operating jointly in the manner and for the purpose described.

THOMAS N. FOSTER.

Witnesses:
 H. M. CORBIN,
 E. Q. SEWELL.